(12) United States Patent
Mayes, Jr.

(10) Patent No.: US 6,916,417 B2
(45) Date of Patent: *Jul. 12, 2005

(54) CATALYTIC CRACKING OF A RESIDUUM FEEDSTOCK TO PRODUCE LOWER MOLECULAR WEIGHT GASEOUS PRODUCTS

(76) Inventor: Warden W. Mayes, Jr., 9945 Tanglevine Dr., Dallas, TX (US) 75238

( * ) Notice: Subject to any disclaimer, the term of this patent is extended or adjusted under 35 U.S.C. 154(b) by 0 days.

This patent is subject to a terminal disclaimer.

(21) Appl. No.: 10/457,169

(22) Filed: Jun. 9, 2003

(65) Prior Publication Data
US 2004/0121898 A1 Jun. 24, 2004

Related U.S. Application Data

(63) Continuation-in-part of application No. 10/413,728, filed on Apr. 15, 2003, which is a continuation-in-part of application No. 10/272,709, filed on Oct. 17, 2002, now Pat. No. 6,585,884, which is a continuation-in-part of application No. 09/704,085, filed on Nov. 1, 2000, now Pat. No. 6,491,810.

(51) Int. Cl.$^7$ .................. B01J 38/20; B01J 38/40; C01B 3/02; C01B 31/18; C10G 11/00
(52) U.S. Cl. .................. 208/113; 208/121; 208/122; 208/123; 208/124; 252/373; 502/38; 502/39; 502/49
(58) Field of Search .................. 208/113; 252/373; 502/38, 39, 49; 423/418.2

(56) References Cited

U.S. PATENT DOCUMENTS

| | | |
|---|---|---|
| 2,488,718 A | 11/1949 | Forrester |
| 4,272,402 A | 6/1981 | Mayes |
| 4,274,942 A | 6/1981 | Bartholic et al. |
| 4,276,150 A | 6/1981 | McHenry, Jr. |
| 4,304,659 A | 12/1981 | Pratt et al. |
| 4,354,925 A | 10/1982 | Schorfheide |
| 4,376,038 A | 3/1983 | Myers, deceased |
| 4,388,218 A | 6/1983 | Rowe |
| 4,406,773 A | 9/1983 | Hettinger, Jr. et al. |
| 4,542,114 A | 9/1985 | Hegarty |
| 4,666,596 A | 5/1987 | Oelbermann et al. |
| 4,849,092 A * | 7/1989 | Ham et al. .................. 208/140 |
| 4,965,232 A | 10/1990 | Mauleon et al. |
| 5,009,769 A * | 4/1991 | Goelzer .................. 208/113 |
| 5,565,089 A | 10/1996 | Ramachandran et al. |
| 5,716,514 A | 2/1998 | Buchanan |
| 5,814,208 A * | 9/1998 | Menon et al. .................. 208/113 |
| 5,883,031 A | 3/1999 | Innes et al. |
| 5,908,804 A | 6/1999 | Menon et al. |
| 6,491,810 B1 * | 12/2002 | Mayes, Jr. .................. 208/113 |
| 6,585,884 B1 * | 7/2003 | Mayes, Jr. .................. 208/113 |

FOREIGN PATENT DOCUMENTS

| | | |
|---|---|---|
| EP | 0 152 845 | 8/1985 |
| JP | 61 151012 | 7/1986 |

* cited by examiner

Primary Examiner—Wayne A. Langel

(57) ABSTRACT

The present invention provides a catalytic cracking process. The process includes introducing at least one species of a natural or synthetic residuum containing feedstock and a catalyst into a catalytic cracker reaction zone, and thereafter cracking the feedstock into a lower molecular weight gaseous product and spent cracking catalyst with hydrocarbonaceous product deposited thereon. Among others, the lower molecular weight gaseous product includes ethylene or propylene. The spent cracking catalyst obtained from the catalytic cracker reaction zone may then be regenerated using a first and a second regeneration zone. The first regeneration zone may be operated in an oxidizing mode resulting in a remaining coke of reduced hydrogen content which lowers the moisture content of flue gas in subsequent regeneration zones. The second regeneration zone, may be operated in a partial oxidizing mode and with a controlled carbon dioxide content in the second combustion atmosphere as a reactant with carbon for forming additional carbon monoxide in the flue gas of the second regeneration zone.

11 Claims, 2 Drawing Sheets

CATALYTIC CRACKING OF A RESIDUUM FEEDSTOCK TO PRODUCE LOWER MOLECULAR WEIGHT GASEOUS PRODUCTS

CROSS-REFERENCE TO RELATED APPLICATIONS

This application is a continuation-in-part of U.S. patent application Ser. No. 10/413,728, entitled "A METHOD OF PRODUCING SYNTHESIS GAS FROM A REGENERATION OF SPENT CRACKING CATALYST," filed on Apr. 15, 2003, pending, which is a continuation-in-part of U.S. application Ser. No. 10/272,709, entitled "METHOD OF PRODUCING SYNTHESIS GAS FROM A REGENERATION OF SPENT CRACKING CATALYST," filed on Oct. 17, 2002 U.S. Pat. No. 6,585,884, which is a continuation-in-part of U.S. application Ser. No. 09/704,085, U.S. Pat. No. 6,491,810, entitled "METHOD OF PRODUCING SYNTHESIS GAS FROM A REGENERATION OF SPENT CRACKING CATALYST," filed on Nov. 1, 2000, and issued on Dec. 10, 2002. The above-listed applications are commonly assigned with the present invention and are incorporated herein by reference as if reproduced herein in its entirety.

TECHNICAL FIELD OF THE INVENTION

The present invention is directed, in general, to a method of using a catalytic cracker and, more specifically, to a process for catalytically cracking residuum feedstock to produce lower molecular weight gaseous products.

BACKGROUND OF THE INVENTION

Catalytic cracking processes have been developed principally for upgrading feedstock derived from natural or synthetic crude oil to more valuable hydrocarbon mixtures, particularly of lower molecular weight. These lower molecular weight hydrocarbons are generally more desirable because of their higher quality and market value. In a typical catalytic cracking process, a crude oil derived feedstock is contacted with a hot, regenerated catalyst, at temperatures ranging from about 1200° F. to about 1400° F. and low to moderate pressures. The chemical reactions that take place in the presence of the catalyst include predominantly scission of carbon-to-carbon bonds (simply cracking), isomerization, polymerization, dehydrogenation, hydrogen transfer, and others, generally leading to lower molecular weight hydrocarbon products.

Some of the cracking reactions in the catalytic cracker also produce hydrocarbonaceous compounds of high molecular weight, of very low volatility, of very high carbon content and of low combined hydrogen content. The hydrocarbonaceous compounds tend to be deposited on the active surfaces of the cracking catalyst and mask the active sites, rendering the catalyst less active, thus unsuitable for continued cracking without regeneration. Deposits of the hydrocarbonaceous matter and the inclusion of absorbed and adsorbed hydrocarbons, as well as the vaporous combustible components in the fluidizing media between the solid catalyst particles, collectively called "coke," are in a sense undesirable. In response to the undesirable buildup of coke on the surfaces of the catalyst, the oil and gas industry has developed several techniques to reduce or remove such buildups.

One technique currently used to reduce the coke forming characteristics of feedstocks, includes without limitation, hydrotreatment, distillation, or extraction of the natural or synthetic crude feedstock prior to charging it to the catalytic cracker. Hydrotreatment, distillation, or extraction of the crude oil derived feedstock serves to remove a substantial amount of the coke precursors, such as contained in asphaltenes, polynuclear aromatics, etc., prior to catalytic cracking. Hydrotreatment, distillation, or extraction are somewhat effective in reducing or removing large amounts of coke precursors from the crude oil derived feedstock, however, such processes are expensive and time-consuming. Currently, incrementally available crude oil is of high residuum content and of higher coke forming characteristics at a time when it is unpopular or unlawful to utilize this additional residuum as fuel oil. At the same time, the market for residuum products, other than as fuel oil, is saturated. Additionally, to upgrade the residuum materials by the available technology results in products of lower quality (and lower market value) than would be achieved by catalytic cracking, provided the coke yield can be handled. Moreover, current and anticipated Federal and State legislation has, and is, scrutinizing the environmental and storage issues associated with use, removal or conversion of the coke precursors. Therefore, there is a great need for an environmentally responsible conversion of the residuum portion of crude oil.

Another technique currently used to remove coke formation from the spent cracking catalyst is to burn the coke away from the catalyst surface using an oxygen-containing gas stream in a separate regeneration reactor. In such a situation, air, oxygen, carbon dioxide, and steam for diluent as combustion gas, may be introduced into the spent cracking catalyst in the lower portion of the regeneration zone(s), while cyclones are provided in the upper portion of the regeneration zone for separating the combustion gas from the entrained catalyst particles. The coke buildup removal process attempts to substantially remove the coke buildup, and is generally effective, but large amounts of greenhouse gases are produced, at least some of which are released into the atmosphere, which is generally environmentally undesirable. Another technique teaches the use of a waste heat boiler as a means of reducing greenhouse gases going to the atmosphere, however, the reduction by this method remains limited to the achievable concentration of a fired heater. In each of the aforementioned techniques the initial regeneration zone is operated in a partial oxidizing (reducing) mode, and any other regeneration zone is operated in an oxidizing mode. U.S. Pat. No. 4,388,218 entitled "Regeneration of Cracking Catalyst in Two Successive Zones" to Rowe, and U.S. Pat. No. 4,331,533 entitled "Method and Apparatus for Cracking Residual Oils" to Dean et al., further detail such processes and are included herein by reference.

Similarly, the regeneration zone must be carried out in such a way that it is in thermal equilibrium with the cracking reaction zone. In other words, the sensible heat of the hot regenerated catalyst in the catalytic cracker should be in balance with the heat requirements of the catalytic cracking reactor zone. In conventional operations, excluding the use of internal or external cooling coils for removing heat from the regenerator reaction zone, coke yield of only about 5 to about 8 weight percent of the total feed may be burned from the catalyst, without exceeding the amount of heat required to balance and sustain the cracking reaction.

Thus, to maintain the thermal balance needed to operate the catalytic cracker and remove enough of the coke from the catalyst to sustain the cracking process, one of two things should be done. First, the amount of coke that forms on the surface of the catalyst should be reduced. However, as mentioned above, this can typically be accomplished by using higher quality feedstock, which is more costly, or subjecting the currently available feedstock to the previously mentioned upgrading, such as but not limited to, hydrotreatment, distillation or extraction processes, which are also more costly. Second, internal or external cooling units could be installed in the regeneration units. However, such internal or external cooling units are costly and unreliable.

Accordingly, what is needed in the art is a method of catalytically cracking crude oil derived feedstock having high coke forming characteristics, without experiencing the drawbacks of the prior art methods.

SUMMARY OF THE INVENTION

To address the above-discussed problems of the prior art, the present invention provides a catalytic cracking process. The process includes introducing at least one species of a natural or synthetic residuum feedstock and a catalyst into a catalytic cracker reaction zone, and thereafter cracking the feedstock into a lower molecular weight gaseous product and spent cracking catalyst with hydrocarbonaceous product deposited thereon. The spent cracking catalyst obtained from the catalytic cracker reaction zone may then be regenerated. In one embodiment, the spent cracking catalyst is regenerated by introducing the spent cracking catalyst into a first regeneration zone in a presence of a first atmosphere comprising a first oxygen containing gas at a first regeneration temperature. For example, a temperature that does not exceed about 1400° F., and more preferable, a temperature that ranges from about 1150° F. to about 1400° F., may be used as the first regeneration temperature. The first regeneration zone oxidizes a greater proportion of a hydrogen content than carbon content of coke associated with the spent cracking catalyst, thereby substantially reducing a water content of a subsequent regeneration zone, thereby reducing cracking catalyst damage resulting from the high temperature regeneration with a high moisture content atmosphere.

The method further includes introducing the spent cracking catalyst from the first regeneration zone into a second regeneration zone. The spent cracking catalyst is introduced into the second regeneration zone in a presence of a second atmosphere comprising a second oxygen containing gas and carbon dioxide, and at a second regeneration temperature substantially greater than the first regeneration temperature. For example, the second regeneration zone may be operated at a temperature ranging from about 1500° F. to about 1800° F. and maintained in a partial oxidation mode. In such an instance, the second atmosphere, the second regeneration zone temperature and the partial oxidation mode of operation results in a substantial portion of the carbon dioxide of the second atmosphere to function as a reactant with carbon content of the coke remaining associated with the spent cracking catalyst to form two moles of carbon monoxide per mole of carbon dioxide reacted, and thus result in a synthesis gas product rich in carbon monoxide.

In contrast to the prior art catalytic cracking method, the above-mentioned method is capable of producing commercial amounts of synthesis gas, which may then be commercially used or sold. Moreover, the above-mentioned method is capable of accepting feedstock having high coke forming characteristics, which in one advantageous embodiment, may be accepted without hydrotreating, separating as a distillation overhead product, or solvent extracting as an extract product the feedstock prior to catalytic cracking. Both the ability to accept, and the ability to accept without the need for hydrotreating, distillation, or solvent extraction, provide both economical and environmental benefits not achieved in the prior art methods.

In another aspect of the invention, the synthesis gas comprises carbon monoxide. Where the amount of synthesis gas produced is inadequate to meet the market needs or the intended system consumption capacity, in an alternative aspect, a supplemental fuel, such as a hydrocarbonaceous material, may be introduced into the spent catalyst flow path through the regeneration zones. Preferably this is added at or near the entrance to the first regeneration zone, in order that the combined hydrogen content will be reduced in the first regeneration zone, thus subsequent regeneration zones will have reduced water formation therein. The supplemental fuel is preferably one of low hydrogen content and is preferably introduced into the first regeneration zone.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
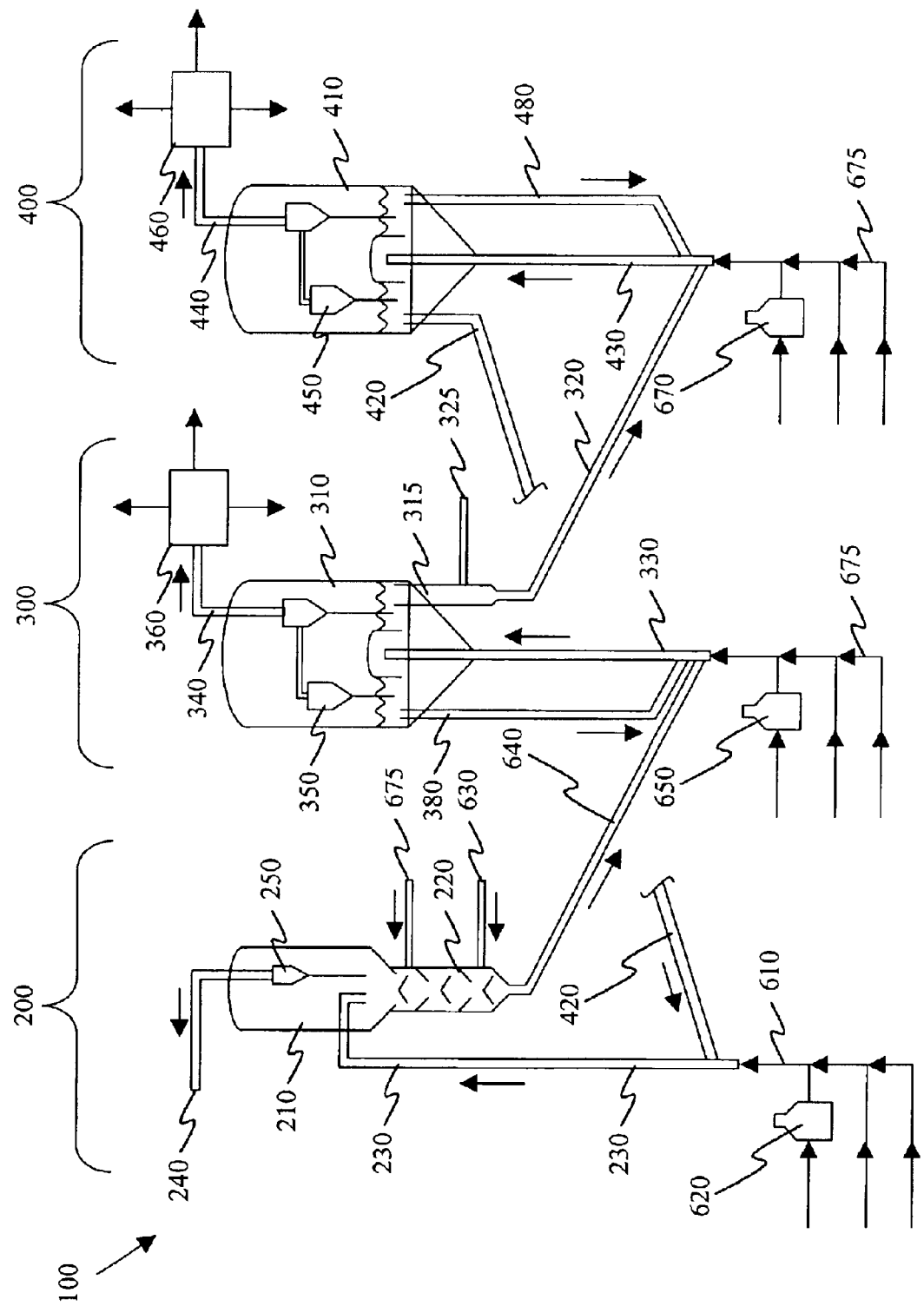
FIG. 1 illustrates one embodiment of a catalytic cracking system wherein the inventive method may be practiced.

The embodiments of the present invention, among other things, teach the catalytic cracking of residuum feedstock to a cracking severity sufficient to maximize a product rich in ethylene and propylene. In contrast, the prior art only teaches the catalytic cracking of a gas oil type feedstock to produce low molecular weight products such as one rich in ethylene and uses catalyst cooling equipment in the regeneration section to maintain the heat balance between the heat release of the regeneration zone(s) and the heat requirements of the cracking reaction zone(s). The prior art, however, does not teach the use of a feedstock of high coke forming characteristics, such as without significant limitations, residuum feedstock to produce lower molecular weight product, such as without limitations ethylene, without using heat removal from the spent catalyst regeneration zone(s).

The customary feedstock in the thermal cracking prior art for producing such products as ethylene includes: 1) LPGs such as ethane and propane, 2) naphtha, 3) condensate, or components thereof. The prior art also teaches the use of residuum feedstock for coking, but the yield potential of lower molecular weight component is not significant because such prior art produces mostly coker gasoline, middle distillate, fuel oil, and petroleum coke, generally of high sulfur content and the petroleum coke must compete with coal (on a calorific and sulfur content basis) in the market place. This equipment also, must have much parallel equipment to maintain on stream time.

In contrast, the embodiments disclosed herein facilitate a steady state design for continuous, sustained operability without parallel equipment for not only cracking, but highly selective catalytic cracking with well developed and selective, prior art catalyst and wherein the coke (hydrocarbonaceous portion) of the product is deposited on the catalyst within the cracking reaction zone(s) and may be removed from the cracking reaction zone with the spent cracking catalyst.

The catalytic cracking of feedstock of high coke forming characteristics, such as without limitations, residuum feedstock using the prior art teaching has been limited, for the most part, to a product of gasoline and higher boiling range components and managing the excessive coke formation by operating catalyst cooling coils as a means of managing the excessive coke formation by operating catalyst cooling coils. In the embodiments of the present invention, however, coke production in excess of that needed to sustain heat balance between regeneration zone and the cracking reaction zone is accommodated by introducing a carbon dioxide rich stream as a reactant to chemically react with the carbon content of the coke endothermically, thus controlling the regeneration reactions net heat release.

Accordingly, before the present invention, all the art failed to show a continuous process for regenerating the spent cracking catalyst without removal of excess heat of regeneration in such as internal or external cooling coils. In the herein disclosed invention feedstock of high coke forming characteristics may be catalytically cracked at cracking severity sufficient to maximize lower molecular weight product, such as without limitations ethylene, and then regenerate the heretofore unmanageable high coke yield, producing therefrom a synthesis gas rich in carbon monoxide content while preserving the integrity of prior art catalyst. In one embodiment, a second species of catalyst, effective in promoting partial oxidizing reactions, is used in mixture with the spent cracking catalyst, at least in the second regeneration zone which is operated in partial oxidization mode, and carbon dioxide as a reactant with carbon of the coke.

As used herein, the term residuum feedstock means a hydrocarbon material of natural or synthetic origin with characteristics of 1) containing compounds of high molecular weight, 2) low volatility, 3) relatively high carbon content, 4) relatively lower hydrogen content, 5) relatively high in metallic compounds such as, but without limits, iron, nickel, vanadium. Included within the above meaning of Residuum Feedstock would be a) long residuum, b) short residuum, c) tar, d) pitch, e) asphalt, f) or shale oil residuum.

As also used herein, the term lower molecular weight gaseous product (at least the major portion of which would be in a gaseous phase at ambient temperature and pressure) includes, without limitations, ethylene, ethane, propylene, propane, butylenes, and butanes.

Figure 2:
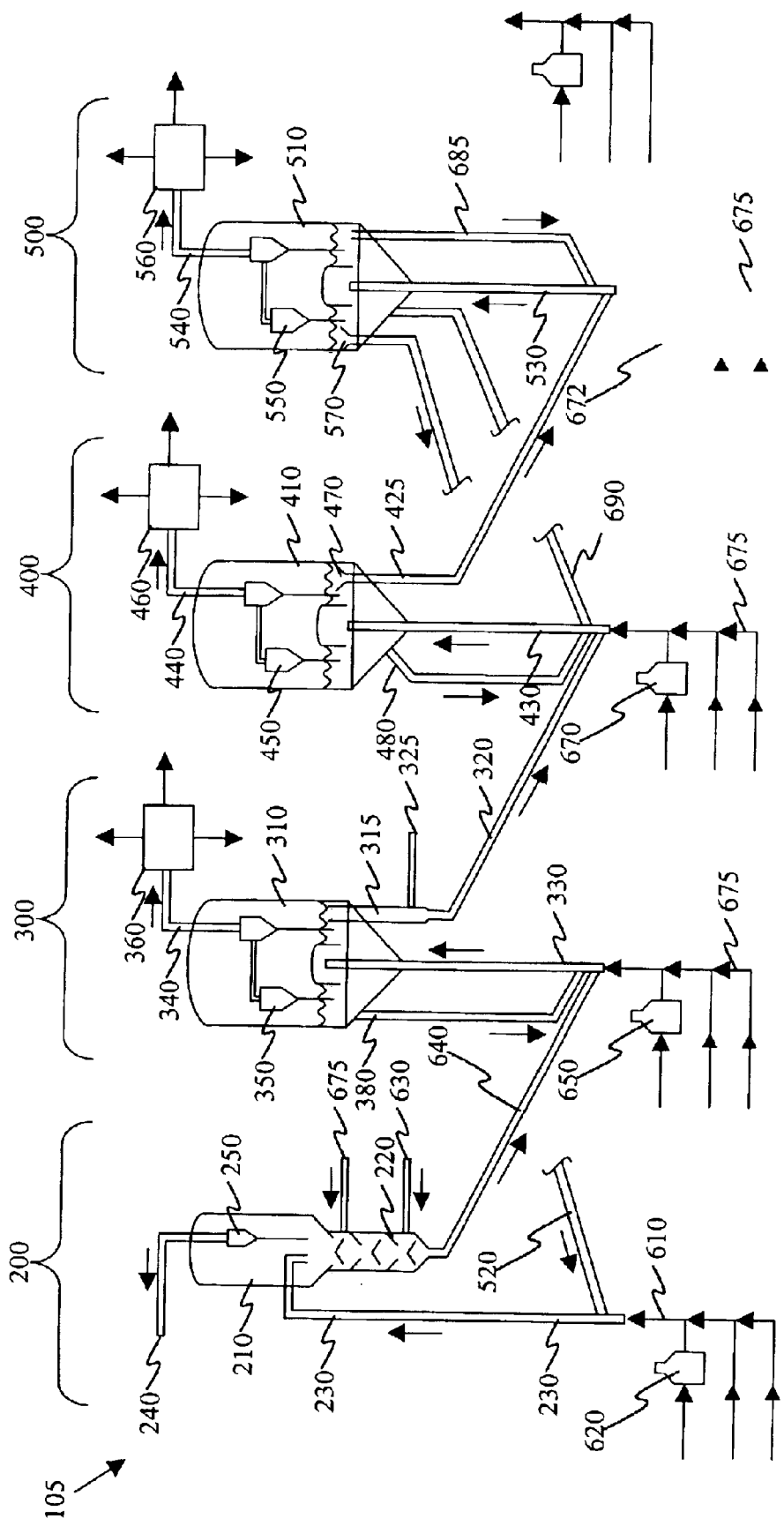
FIG. 2 illustrates an alternative embodiment of a catalytic cracking system having a third regeneration zone wherein the inventive method may be practiced.

Referring now to FIG. 1, illustrated is a schematic diagram of an exemplary configuration of a catalytic cracking system 100, in accordance with the present invention. In the illustrative embodiment shown in FIG. 1, the catalytic cracking system 100 includes a catalytic cracking reaction zone 200, a first regeneration zone 300 and second regeneration zone 400. Those skilled in the art will understand that the catalytic cracking reaction zone 200, first regeneration zone 300 or the second regeneration zone 400 may include a contact system other than the dilute phase (entrained) flow section shown in FIG. 1, there being other cracking reaction zone and/or regeneration zone designs suitable for use with the disclosed invention. Likewise, those skilled in the art will also understand that the present invention is not limited to a single catalytic cracking reaction zone 200 and two regeneration zones 300, 400. Multiple cracking reaction zones and regeneration zones are within the scope of the present invention. (FIG. 2—discussed infra). It should also be noted that certain valves, flanges, fittings, and some associated pumps, exchangers, instruments, etc., may not be shown in FIG. 1 for simplicity reasons.

In the illustrative embodiment shown in FIG. 1, the catalytic cracking reaction zone 200 includes a cracker reactor disengaging space 210, a spent catalyst steam stripper 220, a dilute phase cracking reactor transport line 230 and a cracked product exit transport line 240. The catalytic cracking reaction zone 200 may also, in an exemplary embodiment, include cyclones 250. In the embodiment illustrated in FIG. 1 the cyclones 250 are shown as a single cyclone, however, it should be noted that there may be more than one cyclone in parallel, or even groups of cyclones in series or in series and in parallel. It should be noted that the cyclones for the catalytic cracking reaction zone 200, the first regeneration zone 300 or the second regeneration zone 400 are shown as internal cyclones, but may be externally mounted without changing the teaching of this disclosed invention.

The catalytic cracking reaction zone 200 in the embodiment shown in FIG. 1 is a dilute phase fluid bed catalytic cracker, but those skilled in the art will understand that the fluid bed catalytic cracker may be replaced with a moving bed catalytic cracker, falling bed catalytic cracker, fixed bed catalytic cracker, or any other known or hereafter discovered catalytic cracker, without departing from the scope of the present invention. Also, in an advantageous embodiment, the catalytic cracking reaction zone 200 is designed to crack residuum feedstock (including virgin residuum feedstock) and recycled hydrocarbon feedstock at an optimum cracking temperature for a desired end product. Those skilled in the art understand that separate cracking reaction zones may be provided to allow separate optimum cracking conditions for separate feedstock.

In the illustrative embodiment shown in FIG. 1, the first regeneration zone 300 includes a first disengaging space 310, a first partially regenerated catalyst transport line 320, a first regenerator dilute phase transport line 330 and a first regeneration zone flue gas transport line 340. Similar to the catalytic cracking reaction zone 200, the first regeneration zone 300 may, in a preferred embodiment, include cyclones 350. In the embodiment shown in FIG. 1, two cyclones 350 are shown in series, however, it should be noted that one or more cyclones, internal, external or a mixture of such, in series, parallel, or both, are also within the scope of the present invention. The first regeneration zone 300 may also include a first regeneration zone treating or separation system 360. Any one or combination of known treating or separation processes may be used, for example without limitation, removal of water, sulfur oxide ($SO_x$), nitrogen oxide ($NO_x$) and carbon monoxide (CO). The first regeneration zone 300 shown in FIG. 1 may further include a carbon dioxide stripper 315. The carbon dioxide stripper 315, as illustrated, is located between the first disengaging space 310 and the first partially regenerated catalyst transport line 320, and is configured to displace components, such as without limitation nitrogen and argon, which would otherwise contaminate the synthesis gas product of the second regeneration zone 400.

In the illustrative embodiment shown in FIG. 1, the second regeneration zone 400 includes a second disengaging space 410, a regenerated catalyst transport line 420, a second regenerator dilute phase transport line 430 and a second regeneration zone flue gas transport line 440. Similar to the catalytic cracking reaction zone 200, the second regeneration zone 400 may, in a preferred embodiment, include cyclones 450. In the embodiment shown in FIG. 1, two cyclones 450 are shown in series, however, it should be noted that one or more cyclones, internal, external or a mixture of such, in series, parallel, or both, are also within the scope of the present invention. The second regeneration zone 400 may also include a second regeneration zone treating or separation system 460, wherein the second regeneration zone treating or separation system 460 is similar to the first regeneration zone treating or separation system 360. Those skilled in the art will realize that other types of catalytic cracking system 100 designs may satisfy the requirements of the present invention without changing the teachings disclosed herein, for example without limitations, including using multiple cracking or regeneration reaction zones, with common or separate disengaging spaces, instead of that illustrated in FIG. 1.

It has been found that typical oxidizing reactions proceed more rapidly at higher temperatures. However, it has also been found that each individual oxidizing reaction rate disproportionately changes with temperature. To understand such a process, the following oxidizing reactions have been provided:

$$C + \tfrac{1}{2}O_2 = CO; \quad (1)$$

$$C + O_2 = CO_2; \quad (2)$$

$$C + CO_2 = 2CO; \quad (3)$$

$$C + H_2O = CO + H_2; \text{ and} \quad (4)$$

$$C + 2H_2O = CO_2 + 2H_2. \quad (5)$$

It has further been found that the reaction rate (change in a reactants concentration as a function of time) for reaction (1) increases more rapidly with increased temperature than does reaction (2). At temperatures below 1400° F. the equilibrium molal ratio of $CO/CO_2$ is well below unity, where at temperatures near 1800° F. the $CO/CO_2$ molal ratio is much greater. By limiting oxygen input such that there is little or no excess oxygen at temperatures ranging between the cracking reactor temperature and about 1400° F. the formation of $CO_2$ is favored. At temperatures between about 1400° F. and about 1800° F. the formation of CO is favored and the oxidization is rapid.

It has also been found that even the most thermally stable cracking catalyst commercially used is stable up to a temperature of only about 1400° F. in the presence of the water vapor content normally experienced in regenerating the cracking catalyst. Furthermore, it has been found that such commercially used cracking catalysts may be subjected to temperatures up to about 1800° F. in contact with oxidizing gas (flue gas) of decreased water content, the allowable water content being somewhat inversely proportional to temperature.

It is further known that the reaction rate of reaction (3) is almost nonexistent at or below temperatures of about 1400° F., but becomes significant between about 1400° F. and about 1800° F. From these facts, it has been found that the most favorable method of regenerating a cracking catalyst to produce carbon monoxide (CO) is to first oxidize only enough of the coke as to reduce the concentration of combined hydrogen in the coke, the hydrogen containing compounds being more rapidly oxidized than the resulting elemental carbon content, especially the elemental hydrogen or low molecular weight fuel, such as but not limited to methane. After having reduced the hydrogen content of the coke in the first regeneration zone 300, the remainder of the carbon of the coke in a second regeneration zone 400 (and possibly a third regeneration zone 500, as subsequently shown in FIG. 2) may be oxidized at a higher temperature without damage to the catalyst because of the reduced moisture content.

Turning briefly now to FIG. 2, illustrated is an alternative embodiment of the invention depicting a catalytic cracking system 105 having a third regeneration zone 500. It is to be noted that the elements of the embodiment illustrated in FIG. 2, and their description, are similar to that shown and described in FIG. 1, with the exception that the catalytic cracking system 105 of FIG. 2 also includes the third regeneration zone 500. Additionally, instead of the fully regenerated cracking catalyst flow from the second regeneration zone 400 returning to the catalytic cracking reaction zone 200, as shown in FIG. 1, in FIG. 2 a less than fully regenerated cracking catalyst is directed from the second regeneration zone 400 to a third regeneration zone 500.

As is illustrated in FIG. 2, the third regeneration zone 500 includes a third disengaging space 510, a regenerated catalyst transport line 520, a third regenerator dilute phase transport line 530, and a third regeneration zone flue gas transport line 540. Similar to the catalytic cracking reaction zone 200, the third regeneration zone 500 may, in a preferred embodiment, include cyclones 550. In the embodiment shown in FIG. 2, two cyclones 550 are shown in series, however, it should be noted that one or more cyclones, either internal, external or a mixture of such, in series, in parallel, or both, are within the scope of the present invention. The third regeneration zone 500 may also include a third regeneration zone treating or separation system 560.

Also shown in FIG. 2 is a unique feature of utilizing a second species of a catalyst effective in promoting partial oxidizing reactions. The second species of catalyst is for the most part, but not absolutely, confined to the regeneration zones 300, 400, 500. It may be noted that in FIG. 2, as in FIG. 1, a carbon dioxide stripper 315 may also be utilized to displace by stripping action certain components contained in the fluidizing media of the partially regenerated spent catalyst flowing from the first regeneration zone 300 to the second regeneration zone 400. For example, where air or oxygen enriched air is used in the first regeneration zone 300, the carbon dioxide stripper 315 may be used to displace nitrogen and argon, among others.

With reference again back to the embodiment illustrated in FIG. 1, the discussion will now turn to specific details of a method of using the catalytic cracking system 100, or another similar system, to produce a commercial quality and amount of a synthesis gas while regenerating a spent cracking catalyst. Initially a feedstock 610 is supplied to a lower portion of the dilute phase cracking reactor transport line 230 where it is combined with regenerated catalyst provided from the regenerated catalyst transport line 420. The feedstock 610, in an exemplary embodiment, includes at least one species of a natural or synthetic residuum feedstock. Similarly, the feedstock 610 may include virgin residuum feedstock. In another embodiment, the feedstock 610 comprises a fresh feed stream combined with a recycled hydrocarbon stream and a controlled amount of initial fluidizing and dispersing material, such as gas, hydrogen, or steam. Those skilled in the art will understand the desire to avoid contact between steam and the regenerated catalyst at temperatures about 1400° F. Moreover, prior to entering the lower portion of the dilute phase cracking reactor transport line 230, the feedstock 610 may be preheated in a furnace 620. The furnace 620 may provide for a controlled increase in the temperature of the feedstock 610, or vaporization of at least a part thereof, which may facilitate the cracking reaction of the feedstock 610 in contact with the regenerated catalyst provided from the regenerated catalyst transport line 420. It should be noted, and is well understood by one skilled in the art, that the feedstock 610 flowing through the furnace 620 for preheating, may include at least portions of recycled hydrocarbon stream and initial fluidizing and dispersing material through piping not shown, and that the feedstock 610 could include other similar materials. In one particularly advantageous embodiment, the fresh feed stock stream comprises a high coke forming feedstock, such as an unseparated feedstock containing high amounts of asphalt and pitch. As mentioned above, the feedstock 610 may comprise at least one species of a natural or synthetic residuum feedstock. As previously mentioned, the feedstock may be preheated in the furnace 620, however, in an alternative embodiment, the feedstock 610 may be bypassed around the furnace 620, using lines not shown herein.

After entering the lower portion of the dilute phase cracking reactor transport line 230 and combining with the regenerated catalyst from the regenerated catalyst transport line 420, the hydrocarbons react to form reactants and coke, and the mixture rises to the upper portion of the dilute phase cracking reactor transport line 230. The mixture may then discharge from the upper portion of the dilute phase cracking reactor transport line 230 into the cracker reactor disengaging space 210, where cracking reactions continue. As is understood by one skilled in the art, the cracking process produces vaporous cracked material and spends cracking catalyst by depositing coke thereon. Once within the cracker reactor disengaging space 210, vaporous cracked material rises to the upper portion of the cracker reactor disengaging space 210. In this embodiment, the vaporous cracked material rises to the upper portion of the cracker reactor disengaging space 210 and enters one or a plurality of the cyclones 250. The cyclones 250 tend to separate the vaporous cracked material from any remaining spent catalyst suspended therein. The vaporous cracked material may then rise and exit through the cracked product exit transport line 240 and then flow to separation equipment (not shown). The spent catalyst removed by the cyclones 250 may then flow downwardly and discharge from a dip leg of the cyclones 250.

The vaporous cracked material, in an exemplary embodiment, comprises a lower molecular weight gaseous product. For example, a number of lower molecular weight gaseous products, such as products rich in olefin content, rich in ethylene content, and rich in propylene content. (The term "rich" as used with respect to the olefin, ethylene or propylene content, refers to a quantity and quality of those contents that may be competitively obtained and sold, in one embodiment of the invention.) Other lower molecular weight gaseous products are, however, within the broad scope of the present invention.

The spent catalyst may then flow from the lower portion of the cracker reactor disengaging space 210 to the spent catalyst steam stripper 220. In the illustrative example shown in FIG. 1, the spent catalyst flows downwardly as steam countercurrently flows upwardly. The steam may be provided using a steam input transport line 630, and alternatively may be superheated, up to a temperature of about 1400° F., prior to entering the spent catalyst steam stripper 220. Depending on the design of the spent catalyst steam stripper 220, the upward flowing steam may flow from the spent catalyst steam stripper 220 to the lower portion of the cracker reactor disengaging space 210, or the upward flowing steam may alternatively be withdrawn using a steam seal, piping and valve that is not shown.

Spent and steam stripped, the spent cracking catalyst may flow from the catalytic cracking reaction zone 200, through a carrier transport line 640, to the first regeneration zone 300. In a more specific example, the spent cracking catalyst may enter the lower portion of the first regenerator dilute phase transport line 330. At the lower portion of the first regenerator dilute phase transport line 330, the spent cracking catalyst may be introduced to a first atmosphere comprising a first oxygen containing gas. The first oxygen containing gas comprises a first combustion gas in one embodiment of the invention. For example, the first oxygen containing gas could be air, oxygen enriched air, or another similar oxygen containing gas. Oxygen enriched air may be created using a number of different techniques. In a first technique, oxygen enriched air could be created by adding commercially pure oxygen to air. In another technique, oxygen enriched air could be created by reducing one or more non-oxygen components therefrom, such as without limitations, nitrogen or argon. Any known or hereafter discovered means, such as without limitation, membrane permeation, selective adsorption, partial condensation, flash distillation, etc., could be used to reduce the concentration of aforementioned non-oxygen components.

In a preferred embodiment, the first atmosphere, or components thereof, may be preheated, for example without limitation, in a furnace 650 prior to combining with the spent cracking catalyst. In another preferred embodiment, the furnace 650 preheats the first atmosphere to a temperature substantially equal to the operating temperature of the first regeneration zone 300. The components of the first atmosphere are shown in FIG. 1 as flowing into a common transport line prior to entering the lower portion of the first regenerator dilute phase transport line 330, however, the skilled artisan will understand that any one or any portion of these flows may be introduced through furnace 650 separately or in any combination. Although the preheating of the first atmosphere is shown herein as being accomplished with a furnace 650, the preheating may be accomplished by any means without changing the teachings of this disclosed invention.

The amount of the first oxygen containing gas may vary, however, the amount of the first oxygen containing gas should be adjusted so as to oxidize a minimal portion of the net coke and supplemental fuel, if any, but to reduce the hydrogen content of the coke and supplemental fuel if any associated with the spent cracking catalyst leaving the first regeneration zone 300, yet while raising the temperature of this first regeneration zone 300 to initiate partial oxidizing reactions in the following second regeneration zone 400. In one advantageous embodiment, the amount of each gas component should be controlled to achieve a first regeneration zone 300 temperature not to exceed about 1400° F., and more precisely, a first regeneration zone 300 temperature ranging from about 1150° F. to about 1400° F. Regeneration temperatures above about 1400° F., in the presence of anticipated water concentration, like provided in the first regeneration zone 300, are generally undesirable since they tend to cause damage to the cracking catalyst.

The spent cracking catalyst and the first oxygen containing gas flow upwardly within the first regenerator dilute phase transport line 330 to the first disengaging space 310 for separation of vaporous reactants from the spent cracking catalyst. Partially regenerated catalyst flowing from the upper portion of the first regenerator dilute phase transport line 330 tends to fall into the lower portion of the first disengaging space 310 to form a fluid bed. While located within the fluid bed, additional oxidation of the coke from the partially regenerated catalyst may occur. To facilitate the additional oxidation within the fluid bed, in an exemplary embodiment, additional amounts of the first oxygen containing gas of like or different composition may be introduced within the fluid bed. For example, the additional amounts of the first oxygen containing gas may be introduced within the lower portion of the fluid bed through a distribution grid or piping coil, not shown.

The vaporous reactants of the first regeneration zone 300 tend to rise within the first disengaging space 310 and enter cyclones 350. The cyclones 350, similar to the cyclones 250 described above with respect to the catalytic cracking reaction zone 200, may separate suspended spent catalyst from the vaporous reactant's flue gas. Spent catalyst removed from the vaporous flue gas within cyclones 350 flows downwardly through the dip leg to the fluid bed, as the vaporous flue gas exits the first regeneration zone 300 through the first regeneration zone flue gas transport line 340. In one advantageous embodiment, the vaporous flue gas then enters the first regeneration zone treating or separation system 360. The vaporous flue gas may be given treatment or separation utilizing any one or more of several types of well-known treatments. Such treatments or separation may separate the vaporous flue gas into its constituent components consistent with its intended use. At temperatures ranging from about 1150° F. to about 1400° F., the most rapid components to oxidize are those which contain hydrogen content, sulfur content and nitrogen content, however, carbon dioxide content, carbon monoxide content and other pollutants are also present in the flue gas. In one particularly advantageous embodiment, the carbon dioxide content of the flue gas by-product of the first regeneration zone 300, with or without separation treatment as described above, may provide at least a portion of the carbon dioxide needed in the first or second regeneration zones 300, 400, or in the carbon dioxide stripper 315, described in more detail below.

A portion of the hot partially regenerated spent catalyst located within the fluid bed may be recycled through a transport line 380 to the lower portion of the first regenerator dilute phase transport line 330. This flow may be used to increase the initial combined temperature and thus accelerate the initial oxidizing reaction rate in the first regenerator dilute phase transport line 330. However, the net cracking catalyst portion of the partially regenerated spent catalyst travels from the first disengaging space 310 to the second regeneration zone 400. In a preferred embodiment, the remaining portion of the partially regenerated spent catalyst travels through the first partially regenerated catalyst transport line 320 to a lower portion of the second regenerator dilute phase transport line 430.

Those skilled in the art will realize that partially regenerated spent cracking catalyst flowing from the first regeneration zone 300 will carry with it into the second regeneration zone 400 diluting components of the first oxygen containing gas, if present, such as without limitation nitrogen and argon where air or some forms of oxygen enriched air is used as the first oxygen containing gas in the fluidizing media between the catalyst particles. In a preferred embodiment shown in FIG. 1, the partially regenerated spent cracking catalyst is stripped with gaseous carbon dioxide rich stream of low moisture content (preferably less than 1 mole percent moisture) thus replacing the diluting components, such as without limitations, nitrogen and argon which would otherwise appear in the synthesis gas product described below. In such a stripping process, the partially regenerated spent cracking catalyst from the lower portion of the first disengaging space 310 flows into the carbon dioxide stripper 315 where the catalyst is contacted with rising carbon dioxide containing stream introduced through carbon dioxide transport line 325. The carbon dioxide containing stream rises in the carbon dioxide stripper 315 while partially regenerated spent cracking catalyst flows downwardly as fluidizing media between the catalyst particles and in the void space thereof, is replaced with carbon dioxide containing stream. The stripped, partially regenerated, spent cracking catalyst then flows via the first partially regenerated catalyst transport line 320, to the second regenerator dilute phase transport line 430.

At the lower portion of the second regenerator dilute phase transport line 430, the partially regenerated spent cracking catalyst from the first partially regenerated catalyst transport line 320 is introduced to a second atmosphere comprising a second oxygen containing gas and a carbon dioxide containing stream. In a preferred embodiment, the second atmosphere comprises a combustion gas. The partially regenerated spent cracking catalyst and the second atmosphere, in an exemplary embodiment, are substantially water-free. For example, in another exemplary embodiment, flue gas from the regeneration of the partially regenerated spent cracking catalyst along with the second atmosphere, have a water content ranging from about 1 to about 10 mole percent.

As used herein, oxygen includes commercially available pure, or internally produced pure oxygen. As also used herein, the carbon dioxide containing stream includes, without limitation, pure carbon dioxide as well as carbon dioxide rich gas. Preferably, the carbon dioxide rich gas comprises in excess of about 50 mole percent carbon dioxide, and even more preferably, in excess of about 75 mole percent carbon dioxide. It should be noted, however, that the present invention is not limited to such percentages.

In one particularly advantageous embodiment, the carbon dioxide content of the flue gas by-product of the first regeneration zone 300 may provide at least a portion of the carbon dioxide containing stream needed in the second regeneration zone 400 and/or the carbon dioxide stripping of the partially regenerated spent cracking catalyst. In an alternative embodiment the carbon dioxide rich flue gas of the third regeneration zone 500 (FIG. 2), if used, may be used in any one or any combination of the oxygen containing atmospheres or the carbon dioxide stripping of partially regenerated spent cracking catalyst that it might be required, and may be at least partially utilized in its naturally occurring hot, relatively dry state. In a preferred embodiment, the second atmosphere, or strictly the carbon dioxide containing stream portion of the atmosphere, may be preheated in a furnace 670 prior to or after combining with the oxygen containing gas and the spent cracking catalyst. Similar to the furnace 650, the furnace 670 may preheat the second atmosphere, or strictly the carbon dioxide containing stream portion of the atmosphere, to a temperature substantially equal to the operating temperature of the second regeneration zone 400. Those skilled in the art will also realize that the preheating of the second atmosphere, or strictly the carbon dioxide containing stream portion of the atmosphere, may also be accomplished by heat exchange with a hot process stream. The hot process stream, in an exemplary embodiment, could include the first regeneration zone flue gas transport line 340 or the second regeneration zone flue gas transport line 440. The second atmosphere, or strictly the carbon dioxide containing stream portion of the atmosphere, is preferably preheated because it has been found that the carbon dioxide will not begin to react with the carbon of the coke significantly until the temperature is greater than about 1400° F., but at such temperature it reacts endothermically to form more carbon monoxide at a decreasing temperature, thus limiting the second reactor temperature in the second regeneration zone 400. The components of the second atmosphere are shown in FIG. 1 as flowing into a common transport line prior to entering the lower portion of the second regenerator dilute phase transport line 430, however the skilled artisan will understand that any one or a portion of these flows may be introduced separately or in combination.

The flow rate of each component of the second atmosphere introduced to the second regeneration zone 400 may vary, however, the flow rate of each component should be adjusted independently so as to oxidize a substantial portion of the remaining net coke production, yet operate in a partial oxidizing mode. In one advantageous embodiment, the amount of each component should be controlled individually to achieve a second regeneration zone 400 temperature substantially greater than the first regeneration zone 300 temperature, and to achieve optimum conversion of the coke and supplemental fuel to carbon monoxide. For example, the second regeneration zone 400 temperature should be greater than the maximum of 1400° F. used in the first regeneration zone 300. In an exemplary embodiment, the second regeneration zone 400 temperature may range from about 1500° F. to about 1800° F. Since the water forming hydrogen content of the coke was substantially reduced in the first regeneration zone 300, the partially regenerated spent cracking catalyst can handle temperatures up to about 1800° F. without damage, which is contrary to the first regeneration zone 300, and contrary to the prior art carbon monoxide (synthesis gas) forming regenerators. Generally, the heat generated in the second reaction zone 400 is desirable for the reaction and should remain therein. For example, in a preferred embodiment the first and second regeneration zones 300, 400, respectively, should not have a significant amount of heat removed, because to do so could suppress the endothermic reaction of carbon dioxide with carbon, to form additional carbon monoxide and reduce the cost of oxygen requirements. Thus, those skilled in the art now understand the use of carbon dioxide to minimize the costly oxygen requirement and to maximize the production of carbon monoxide.

Continuing the description of FIG. 1, the partially regenerated spent cracking catalyst and the second atmosphere flow upwardly within the second regenerator dilute phase transport line 430 to the second disengaging space 410 for separation of a substantial portion of the remaining coke from the partially regenerated spent catalyst. Partially regenerated catalyst flowing from the upper portion of the second regenerator dilute phase transport line 430 tends to fall into the lower portion of the second disengaging space 410 to form a fluid bed. While located within the fluid bed, additional oxidation of the coke from the partially regenerated catalyst may occur. To facilitate the additional oxidation within the fluid bed, in an exemplary embodiment, additional oxygen containing combustion gas may be introduced within the fluid bed. For example, the additional oxygen containing combustion gas may be introduced within the fluid bed at a point below a distribution grid or piping coil (not shown).

The vaporous reactants of the second regeneration zone 400 tend to rise within the second disengaging space 410 and enter the cyclones 450. The cyclones 450, similar to the cyclones 250 found within the catalytic cracking reaction zone 200, may separate suspended spent catalyst from the vaporous flue gas. Spent catalyst removed from the vaporous flue gas may then flow downwardly through the dip leg of the cyclones 450 to the fluid bed, as the vaporous flue gas exits the second regeneration zone 400 through the second regeneration zone flue gas transport line 440. The vaporous flue gas may then enter the second regeneration zone treating or separation system 460. The vaporous flue gas may be given treatment or separation utilizing any one or more of several types of well-known treatments or separations. Such treatments, if utilized, may separate the vaporous flue gas into its constituent components. In contrast to the first regeneration zone 300 where larger amounts of carbon dioxide are formed, the second regeneration zone 400 produces larger amounts of synthesis gas, such as carbon monoxide. This is a result of the higher temperatures used in the second regeneration zone 400 and in a partial oxidizing mode which conditions favor the formation of carbon monoxide rather than carbon dioxide. Other minor constituents produced by the treatment of the vaporous flue gas include water, sulfur compounds, nitrogen compounds, carbon dioxide and particulate matter. It should be pointed out that, in contrast to the prior art systems, it has been found that the use of cooling coils within either the first or second regeneration zones 300, 400, simply reduces the efficiency of the first and second regeneration zones 300, 400, to maximize the production of carbon monoxide. For such a reason, it is preferred that cooling coils not be used within the first or second regeneration zones 300, 400.

In one particularly advantageous embodiment, high enough amounts of carbon monoxide are produced from the oxidizing of coke and alternatively supplemental fuels, if any, to fuel or feed other systems within the petrochemical plant, or be sold to an external enterprise. Regardless, using the above-mentioned process has turned what was historically considered waste into a valuable and profitable resource.

In situations where the operator of the catalytic cracking system 100 has entered into an agreement with an external enterprise to provide a specified amount of carbon monoxide, and the coke forming characteristics of the feedstock are not great enough to provide the agreed upon quantity of carbon monoxide or hydrogen gas, supplemental fuel 675 may be included at most any point in the flow path of the spent cracking catalyst, with consideration of the hydrogen content and volatile component content. Although the supplemental fuel 675 may be added at any one of many points, it is preferred to add it to the spent catalyst steam stripper 220 ahead of the first regeneration zone 300 so as to reduce the hydrogen content and/or volatile component content, if any, of such supplemental fuel 675. Such carbon-based materials may include carbon derived from coal, pitch, and many others. Furthermore, it is preferred to use a high carbon-based material having low concentrations of hydrogen, ash, and sulfur.

It should be noted that carbon monoxide may not be the only flue gas constituent produced in high enough quality or quantities for resale. In a preferred embodiment of the invention, carbon dioxide flue gas by-product or the carbon dioxide content thereof produced from the first regeneration zone 300, and carbon dioxide content of flue gas by-product produced from the second regeneration zone 400, is produced in a quantity sufficient to provide the carbon dioxide containing stream needed in the second regeneration zone 400, and also provide an additional quantity of carbon dioxide sufficient for resale. Hydrogen gas content may also be recovered or produced from the second regeneration zone 400 flue gas by-product for separate use or sale. Additionally, flue gas by-product (e.g., synthesis gas) from the second regeneration zone 400 rich in carbon monoxide, may, external of the regeneration zone, be subjected to a classical water gas reaction to adjust the hydrogen content, provided that the reactant water vapor does not contact the cracking catalyst at the second regeneration zone temperature. If this occurs, the carbon monoxide may react with the water to form hydrogen content, and the hydrogen may thereafter be separated for further use or sale.

Once the vaporous flue gas has been separated from the substantially regenerated catalyst, a portion of the hot substantially regenerated catalyst located within the fluid bed may be recycled through a hot recycle catalyst transport line 480 to the lower portion of the second regenerator dilute phase transport line 430, to increase the initial temperature therein. However, the remaining portion of the now regenerated cracking catalyst travels through the regenerated catalyst transport line 420 to the lower portion of the dilute phase cracking reactor transport line 230 to complete the cracking catalyst circulation. The net substantially regenerated catalyst would then recombine with the feedstock as previously mentioned, and the process would repeat itself.

With reference henceforth to FIG. 2, a process of catalytically cracking feedstock of high coke-forming characteristics and regenerating the spent cracking catalyst therefrom so as to produce synthesis gas using a catalytic cracking system 105 is disclosed. Certain remarkable features of the catalytic cracking system 105 of FIG. 2 include a second regeneration zone 400 operated much as in FIG. 1, in the same temperature range and in a partial oxidizing mode, but uniquely utilizing a second species of catalyst effective in accelerating the partial oxidizing reactions. This second species of catalyst may be mixed with spent cracking catalyst in the second regeneration zone 400 alone or in the second and third regeneration zone 400, 500, as shown in FIG. 2. The second species of catalyst may be mixed with cracking catalyst during regeneration and separated from the spent cracking catalyst by any physical means, as it is done for example without limitation by elutriation in FIG. 2 when the regeneration objective for the respective regeneration zone has been achieved. In a preferred embodiment, a Group VIII metal, such as without limitations, cobalt and/or nickel content on an inorganic refractory support catalyst of particle size larger than the fluid cracking catalyst, may be used for formulation of the second species of catalyst. The skilled artisan will understand from the disclosed description of FIG. 2, how the use of a second species of catalyst may also be effectively employed in a two regeneration zone cracking process as well as with more than two such regeneration zones. Those skilled in the art will understand how the second species of catalyst may be withdrawn from the regeneration zones 400, 500, and regenerated in external equipment not show in FIG. 1 or 2, and then returned to the regeneration zone for maintaining high activity. Further, those skilled in the art understand how water gas reactions may be conducted on synthesis gas product external of the catalytic cracking system 100, 105, to adjust the hydrogen to carbon monoxide mole ratio. The skilled artisan will further understand that the example of FIG. 2 describes the use of a second species of catalyst for a fluid catalytic cracking process, but this description will make clear to such skilled artisan how to apply the teaching to other catalytic cracking systems, such as without limitation, moving bed catalytic cracking system. In FIG. 2 the second species of catalyst is used in conjunction with the partially regenerated spent cracking catalyst so as to maximize the production of synthesis gas therein. Also shown in FIG. 2 is a third regeneration zone 500 which is operated in an oxidizing mode to restore maximum cracking catalyst activity. Additionally the third regeneration zone 500 may, as is shown in FIG. 2, receive (and return to the second regeneration zone) the second species of catalyst and to regenerate the second species of catalyst, restoring the activity of the second species of catalyst by contaminant reduction, such as without limitations sulfur reduction, and providing a supply of dry carbon dioxide rich gas for use in the second and third regeneration zones 400, 500 respectively, as well as for stripping partially regenerated cracking catalyst exiting the first regeneration zone 300.

The names of component parts of the catalytic cracking reaction zone 200 of FIG. 2, their respective identifying numbers, and the function of the component parts are the same as described in FIG. 1 above except for the source of hot recycle catalyst to the catalytic cracking reaction zone 200. In FIG. 2 hot recycle catalyst to the dilute phase cracking reactor transport line 230 comes via the regenerated catalyst transport line 520, whereas in FIG. 1 the hot regenerated catalyst comes via the regenerated catalyst transport line 420.

With respect to the first regeneration zone 300, the names of component parts, the respective identifying numbers, and the functioning of the component parts is the same for FIG. 2 as was detailed above for FIG. 1, including the carbon dioxide rich stream stripping of the partially regenerated spent cracking catalyst before introducing into the second regeneration zone 400. For the second regeneration zone 400 of FIG. 2, the names of component parts, the respective identifying numbers, and the functioning of the component parts is the same or similar to that given above for FIG. 1 except for differences necessary to employ the second species of catalyst and to add to the catalytic cracking system 105 (FIG. 2) a third regeneration zone 500. The second species of catalyst is added to the second regeneration zone 400 through piping not shown and for practical purposes its presence is maintained in the second regeneration zone 400, and as shown herein, in the third regeneration zone 500. In FIG. 2 the mixture of spent cracking catalyst and the second species of catalyst are admixed within the second regenerator dilute phase transport line 430 and then at least partially separated in the second disengaging space 410, while for exiting the second disengaging space 410 each species is segregated by elutriation.

Continuing the description of FIG. 2, the cracking catalyst thereof has been substantially, but not completely, regenerated within the second regeneration zone 400. The substantially regenerated cracking catalyst exits the second regeneration zone 400 via the second partially regenerated catalyst transport line 425. The second regeneration zone 400 may be equipped with an internal collection trough 470 positioned at a higher elevation position within the second disengaging space 410 than the nozzle for hot recycle catalyst transport line 480. Accordingly, elutriation favors (not to the total exclusion) cracking catalyst entering the internal collection trough 470 and thus the connected second partially regenerated catalyst transport line 425 more than the second species of catalyst. The second species of catalyst is thereby more directed to circulate in the hot recycle catalyst transport line 480 and the second regenerator dilute phase transport line 430, and return to the second disengaging space 410. The separation of the two different species of catalyst is not intended to be exact because some of the second species of catalyst is intended to flow to the third regeneration zone 500 for subjection to oxidizing mode for oxidization regeneration then return to the second regeneration zone 400. It should be clear to the skilled artisan that the use of a second species of catalyst effective in promoting the partial oxidizing reactions (especially the reaction of carbon dioxide with at least a slight excess of carbon of the coke and supplemental fuel if used) is intended to aid in the formation of carbon monoxide, but the employment of the second species of catalyst is at the discretion of the operator.

Partially regenerated spent cracking catalyst within the second regeneration zone 400 flows through the second partially regenerated catalyst transport line 425 to the lower portion of the third regenerator dilute phase transport line 530 of the third regeneration zone 500. Here, the partially regenerated spent cracking catalyst encounters a third atmosphere, comprising a third oxygen containing gas. At this lower portion of the third regenerator dilute phase transport line 530, hot catalyst from the third disengaging space 510 may be added via transport line 685 to increase the initial temperature of the reactants and to accelerate the final regeneration in an oxidizing mode.

In one advantageous embodiment, the third regeneration zone 500 temperature is somewhat similar to the second regeneration zone 400 temperature. For example, the third regeneration zone 500 temperature should also be greater than the 1400° F. used in the first regeneration zone 300. In an exemplary embodiment, the third regeneration zone 500 temperature may range from about 1500° F. to about 1800° F. Since the water forming hydrogen content of the coke was substantially reduced in the first and second regeneration zones 300, 400, the partially regenerated spent cracking catalyst can handle temperatures up to about 1800° F. without damage.

The cracking catalyst rises with the regeneration reactants in the third regenerator dilute phase transport line 530 to the third disengaging space 510, entering in a downwardly direction to a fluid bed of mixed catalyst. A flow of the second species of catalyst is withdrawn in transport line 685 with a controlled portion flowing to the lower portion of the third regenerator dilute phase transport line 530. A regenerated second species of catalyst returns to the second regeneration zone 400 via transport line 690. Vaporous reactants exiting the upper level of the third regenerator dilute phase transport line 530 rise to the upper level of the third disengaging space 510 and enter the cyclones 550. As has been pointed out for other regeneration zones, the cyclones are shown as two cyclones in series but may be internal, external, or mixed and may be any number in series, parallel, or mixed. Fully regenerated cracking catalyst from the third regeneration zone exits via trough 570 and the regenerated catalyst transport line 520 to return to the catalytic cracking reaction zone 200 to complete the circulation. Those skilled in the art will understand that the temperature of the hot regenerated catalyst may be adjusted if needed. The net flow of the second species of catalyst, from the third regeneration zone 500 flows from the third disengaging space 510 through transport line 690 to the lower portion of the second regenerator dilute phase transport line 430 completing its circulation.

As used herein, the distinction between an oxidization mode of operation and a partial oxidization (sometimes called reduction) mode of operation in regeneration by combustion of hydrocarbonaceous material from the surface of catalytic cracking catalyst is determined by the system operating temperature and by relative concentration of reactants, assuming through mixing.

An oxidizing mode of operation will exist where the system operating temperature is relatively low, for example without limitation less than a threshold temperature of about 1400° F. above which threshold temperature carbon dioxide reactant begins to significantly react with at least a slight excess of carbon to form carbon monoxide (coincidentally about the temperature above which conventional catalytic cracking catalyst is damaged by cindering in the presence of significant water vapor), even if all significant oxygen reactant is consumed, and even with an excess of carbon reactant remaining. While some synthesis gas components may be produced at these conditions, such synthesis gas components would be of reduced concentration and admixed with concentrations of carbon dioxide as to be uninteresting except as low calorific value fuel and would cost almost as much to remove diluting impurities for chemical feedstock use as it would cost to produce the synthesis gas of commercial quality from scratch. This operating mode is intended for use in the first regeneration zone described herein and the severity of oxidization may be judged by analyzing the mole ratio of carbon monoxide to carbon dioxide (CO/CO2), which is for the most part a function of operating temperature, as limited to a rather low number at or below 1400° F. by chemical equilibrium.

Where the operating temperature of the cracking catalyst regeneration system of this application is above the threshold temperature where carbon dioxide will react with carbon, the relative concentration of reactants determine whether the system is in an oxidization mode of operation or in a partial oxidization mode of operation.

Where a regeneration system is operated above the threshold temperature and where carbon dioxide is added as a temperature limiting reactant to combine with carbon to form two moles of carbon monoxide, and where the amount of available oxygen reactant to the regeneration zone is less than a stoichiometric amount, (such term meaning herein that the oxygen input would be sufficient to combine with carbon content to form carbon dioxide, with hydrogen content to form water, with sulfur content to form sulfur oxide, and with reactive nitrogen content to form nitrogen oxide) the system is in a partial oxidation mode. This type partial oxidation mode of operation is intended herein for use in the second regeneration zone hereof, where carbon dioxide is introduced such that any excess heat rise of oxygen combining exothermically with carbon to form carbon oxide is balanced by carbon dioxide content reacting with carbon endothermically to limit and control the temperature rise. Just as importantly, however, the reaction of carbon dioxide with carbon increases the synthesis gas component production of carbon monoxide in addition to controlling temperature. The molal ratio of carbon monoxide to carbon dioxide (CO/CO2) is used in part to judge the partial oxidation (reduction) severity of operation.

In a regeneration system operated above the threshold temperature at or above which carbon dioxide will react with carbon, and where the amount of oxygen reactant to the regeneration zone is a stoichiometric amount as herein defined, or an even slightly greater amount, the system is said to be in an oxidization mode of operation. This oxidization mode of operation exemplifies a third regeneration zone where a preferred embodiment uses a third regeneration zone. The flue gas from this oxidizing mode of operation will be relatively water (moisture) free and of high carbon dioxide content, thus suitable for use in the second or third regeneration zones or as a stripping gas for partially regenerated, spent cracking catalyst between the first regeneration zone and the second regeneration zone.

The above-mentioned inventive method of producing a synthesis gas from regeneration of a spent cracking catalyst has many monetary and environmental benefits associated therewith. Of particular importance is the ability of the current inventive method to convert the vaporous flue gas, which was historically considered waste, into usable and non-environmentally objectionable material. Historically, the vaporous flue gas was passed through a waste heat boiler, treated, for example for reduction of sulfur compounds or particulate matter, and released into the atmosphere, all the while raising environmental concerns. However, since the current process is capable of producing commercial amounts of synthesis gas, and that synthesis gas is captured, the amount of particulate matter (PM), sulfur oxide ($SO_x$), nitrogen oxide ($NO_x$) and volatile organic compounds (VOC) released into the atmosphere by the second regeneration zone 400 is substantially reduced. Moreover, not only are these emissions reduced, but they are reduced by purification of product synthesis gas.

Another environmental and monetary benefit resulting from the inventive method of producing a synthesis gas from regeneration of a spent cracking catalyst, resides in the ability of the catalytic cracking system 100, 105 to accept heavier feedstock (long residuum), i.e., feedstocks containing high amounts of asphalt, pitch and other high coke forming constituents, without the need to hydrotreat, distill, or extract such feedstocks prior to catalytic cracking. However, this is not to say that some treatment may not still be profitable, for example without limitations, hydrotreatment for metals content reduction. Currently, the quality of the crude oil derived feedstock has decreased in recent years, and unless one is willing to pay a very high premium to get very high quality feedstock, heavy feedstock was the only option. However, as a result of the above-mentioned process, the catalytic cracking of heavy feedstock is now a plausible option.

Historically, using the high boiling feedstock required distilling, extracting, or hydrotreating of the long residuum, asphalt, pitch and other components of high coke forming characteristic feedstock, prior to catalytically cracking such a feedstock. However, since the distillation process may, with the disclosed invention, be dispensed with for many crude oil sources, environmental and storage concerns associated with the removal of the asphalt, pitch and other high coke forming constituents are substantially reduced. Likewise, any emissions into the atmosphere resulting from the hydrotreating, distillation or extraction processes are substantially reduced. Therefore, the ability to accept raw heavy feedstock is both environmentally and momentarily beneficial.

Some reduction in the emissions from sources other than the catalytic cracker may also be realized. Such possible sources may include, in addition to hydrotreatment, distillation, and extraction processing equipment, the alternate conversion equipment, such as but not limited to, coker processing equipment. Because the amount of long residuum which is processed in such sources is substantially reduced or eliminated, the emissions of such sources would be reduced accordingly. Emissions such as fugitive emissions, however, are generally unaffected unless the total operation is discontinued, although the shut down can be part-time.

Another benefit realized by the inventive method, and more specifically the higher production rate of synthesis gas, is that only about 28% of the heat evolved in complete combustion mode of regeneration is experienced in forming carbon monoxide in the catalyst regenerators. The lower heat output of partial oxidization over complete combustion plays an important roll in maintaining the catalytic cracking system in thermal equilibrium, while continuing to remove enough of the coke from the catalyst to sustain the cracking process.

Although the present invention has been described in detail, those skilled in the art should understand that they can make various changes, substitutions and alterations herein without departing from the spirit and scope of the invention in its broadest form. For example, those skilled in the art will understand that there are almost limitless ways that the process of FIG. 1 or FIG. 2 can be modified without departing from the teachings of the herein described invention.

What is claimed is:

1. A catalytic cracking process, comprising:
   introducing at least one species of a natural or synthetic residuum feedstock and a cracking catalyst into a catalytic cracker reaction zone;
   cracking said feedstock into a lower molecular weight gaseous product and spent cracking catalyst with hydrocarbonaceous product deposited thereon; and
   regenerating said spent cracking catalyst obtained from said catalytic cracker reaction zone, including;
   introducing said spent cracking catalyst into a first regeneration zone in a presence of a first atmosphere containing an oxygen containing gas, wherein said first regeneration zone is operated at a temperature ranging from about 1150° F. to about 1400° F. so as to reduce cracking catalyst damage resulting from higher temperature regeneration with a high moisture content atmosphere, and so as to oxidize a greater proportion of a hydrogen content than carbon content of coke associated with said spent cracking catalyst, thereby substantially reducing a water content of a subsequent regeneration zone; and
   introducing said spent cracking catalyst from said first regeneration zone into a second regeneration zone in a presence of a second atmosphere containing an oxygen containing gas and a carbon dioxide containing stream, wherein said second regeneration zone is operated at a temperature ranging from about 1500° F. to about 1800° F. and maintained in a partial oxidation mode, said second atmosphere, said second regeneration zone temperature and said partial oxidation mode of operation resulting in a substantial portion of said carbon dioxide of said second atmosphere to function as a reactant with carbon remaining associated with said spent cracking catalyst to form two moles of carbon monoxide per mole of carbon dioxide reacted, and thus result in a synthesis gas product rich in carbon monoxide; and
   recycling said regenerated cracking catalyst to said catalytic cracker reaction zone.

2. The method as recited in claim 1 wherein said lower molecular weight gaseous product is rich in olefin content.

3. The method as recited in claim 1 wherein said lower molecular weight gaseous product is rich in ethylene content.

4. The method as recited in claim 1 wherein said lower molecular weight gaseous product is rich in propylene content.

5. The method as recited in claim 1 wherein said catalytic cracker reaction zone is a first catalytic cracker reaction zone and further including at least a second catalytic cracker reaction zone.

6. The method as recited in claim 5 wherein at least one of the first or second catalytic cracker reaction zones is designed to crack virgin residuum feedstock at an optimum cracking temperature for the desired product.

7. The method as recited in claim 5 wherein at least one of the first or second catalytic cracker reaction zones is designed to crack recycled hydrocarbon feedstock from a downstream separation facilities of said catalytic cracker reaction zone, or from external operations, at an optimum cracking temperature for the desired product.

8. The method as recited in claim 6 or 7 wherein the products from the first or second catalytic cracker reaction zones are separated from their respective spent cracking catalyst for regeneration.

9. The method as recited in claim 1 wherein a supplemental fuel is added to a flow path of said spent cracking catalyst.

10. The method as recited in claim 1 wherein said synthesis gas product rich in carbon monoxide is introduced to a separate reaction zone external of said catalytic cracking process for a classical water gas reaction in which the carbon monoxide reacts at least in part with added water vapor to form synthesis gas with adjusted hydrogen to carbon monoxide ratio and may be used or sold or separated and then used or sold.

11. The method as recited in claim 1 further including introducing said spent cracking catalyst from said second regeneration zone into a third regeneration zone in a presence of a third atmosphere comprising a third oxygen containing gas, wherein said third regeneration zone is operated at a temperature ranging from about 1500° F. to about 1800° F. and maintained in an oxidation mode to produce a flue gas by-product rich in carbon dioxide.

* * * * *